United States Patent
Karonen

(10) Patent No.: US 7,252,461 B2
(45) Date of Patent: Aug. 7, 2007

(54) MILLING CUTTER AND AN INDEXABLE MILLING INSERT

(75) Inventor: Matti Karonen, Hedemora (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 11/534,565

(22) Filed: Sep. 22, 2006

(65) Prior Publication Data

US 2007/0071560 A1    Mar. 29, 2007

(30) Foreign Application Priority Data

Sep. 28, 2005   (SE)  .................................. 0502135

(51) Int. Cl.
  *B23B 27/22*    (2006.01)
(52) U.S. Cl. .................. 407/113; 407/114; 407/115; 407/116
(58) Field of Classification Search ............... 407/113, 407/115, 116, 42, 114, 117
  See application file for complete search history.

(56) References Cited

U.S. PATENT DOCUMENTS

| | | | | |
|---|---|---|---|---|
| 5,853,267 | A  * | 12/1998 | Satran et al. ............... | 407/113 |
| 5,951,214 | A  * | 9/1999 | Rothballer et al. ........... | 407/42 |
| 6,142,716 | A  * | 11/2000 | Jordberg et al. ............ | 407/114 |
| 6,929,429 | B2 * | 8/2005 | Riviere ....................... | 407/113 |
| 7,021,871 | B2 * | 4/2006 | Arvidsson et al. .......... | 407/113 |
| 7,073,987 | B2 * | 7/2006 | Hecht ......................... | 407/113 |

2005/0169716 A1    8/2005  Smilovici et al.

FOREIGN PATENT DOCUMENTS

| | | |
|---|---|---|
| DE | 19516893 A1 | 11/1996 |
| DE | 19818833 A1 | 10/1999 |
| EP | 0480576 A1 | 4/1992 |
| EP | 1093874 A1 | 4/2001 |

OTHER PUBLICATIONS

International Search Report from corresponding International Application PCT/SE2006/001041.

* cited by examiner

Primary Examiner—Willmon Fridie, Jr.
(74) Attorney, Agent, or Firm—WRB-IP LLP

(57) ABSTRACT

A milling cutter for chip removing machining includes a milling cutter body with a number of insert pockets in connection with an end of the milling cutter body. An opposite end of the milling cutter body is adapted to cooperate with a tool attachment. An indexable cutting insert is secured in the cutting insert seats, each indexable cutting insert having two substantially identical main surfaces. Two side surfaces and two end surfaces extend between the main surfaces, each main surface including two cutting insert corners, each cutting insert corner including major cutting edge and a minor cutting edge. Parts of each main surface include rake faces. Parts of each side surface and each end surface include clearance surfaces. The cutting insert has a height between the end surfaces and each main surface includes an associated support surface. A perpendicular distance of each main cutting edge to a plane that coincides with the support surface facing away from the main cutting edge increases in a direction from the cutting corner to a crest in the area of a half height of the indexable cutting insert.

14 Claims, 4 Drawing Sheets

MILLING CUTTER AND AN INDEXABLE MILLING INSERT

BACKGROUND AND SUMMARY

The present invention relates to a milling cutter for chip removing machining and an indexable cutting insert according to the preambles of the appended independent claims.

A generally rectangular milling insert is previously known that has two active cutting insert corners, which are provided diagonally opposed on the main surface of the cutting insert. The main cutting edges extend along the long sides of the cutting insert and consequently the minor cutting edges extend along the short sides of the milling insert. Since the milling insert has two active cutting insert corners it is indexable twice.

A milling cutter is also previously known which comprises a milling cutter body that is provided with a number of indexable cutting inserts. Each indexable cutting insert comprises four main cutting edges and one minor cutting edge associated with each major cutting edge. In mounted position in the milling cutter body the indexable cutting insert has a positive axial rake angle and a positive radial rake angle. The indexable cutting insert is generally screw shaped along the extension of the main cutting edge.

It is desirable to provide a milling cutter of the above-captioned defined type and an indexable cutting insert adapted to this, the milling cutter being able to machine right-angled corners in a work piece to great cutting depths.

It is also desirable to develop the indexable cutting insert according to the present invention in such a manner that it becomes indexable four times during its life.

It is also desirable to develop the indexable cutting inserts according to the present invention such that a stable localization of the indexable cutting insert in the milling cutter body is made possible.

According to an aspect of the present invention, a milling cutter for chip removing machining comprises a milling cutter body with at least one insert pocket associated with an end of the milling cutter body, wherein an opposite end of the milling cutter body is shaped to cooperate with a tool attachment, an indexable cutting insert being secured in each cutting insert pocket, wherein each indexable cutting insert has two substantially identical main surfaces, wherein two side surfaces and two end surfaces extend between the main surfaces, each main surface comprising two cutting insert corners, each cutting insert corner comprising a main cutting edge and a minor cutting edge, wherein a part of each main surface comprises rake faces, wherein a part of each side surface and each end surface comprises clearance surfaces, the cutting insert having a height between the end surfaces, each main surface comprising an associated support surface, wherein a perpendicular distance from each main cutting edge on either one of the two main surfaces to a plane that coincides with the support surface on the other one of the two main surfaces increases in direction from the cutting corner defined by the main cutting edge to a crest proximate a half height of the indexable cutting insert.

According to another aspect of the present invention, an indexable cutting insert has two substantially identical main surfaces, wherein two side surfaces and two end surfaces extend between the main surfaces, each main surface comprising two cutting insert corners, each cutting insert corner comprising a main cutting edge and a minor cutting edge, wherein a part of each main surface comprises a rake face, wherein a part of each side surface and each end surface comprises a clearance surface, the cutting insert having a height between the end surfaces, each main surface comprising an associated support surface, wherein a perpendicular distance from each main cutting edge on either one of the two main surfaces to a plane that coincides with the support surface on the other one of the two main surfaces increases in a direction from the cutting corner defined by the main cutting edge to a crest proximate a half height of the indexable cutting insert.

BRIEF DESCRIPTION OF THE DRAWINGS

Below an embodiment of the invention is described, wherein reference is made to the enclosed drawings, wherein.

DETAILED DESCRIPTION

Figure 1:
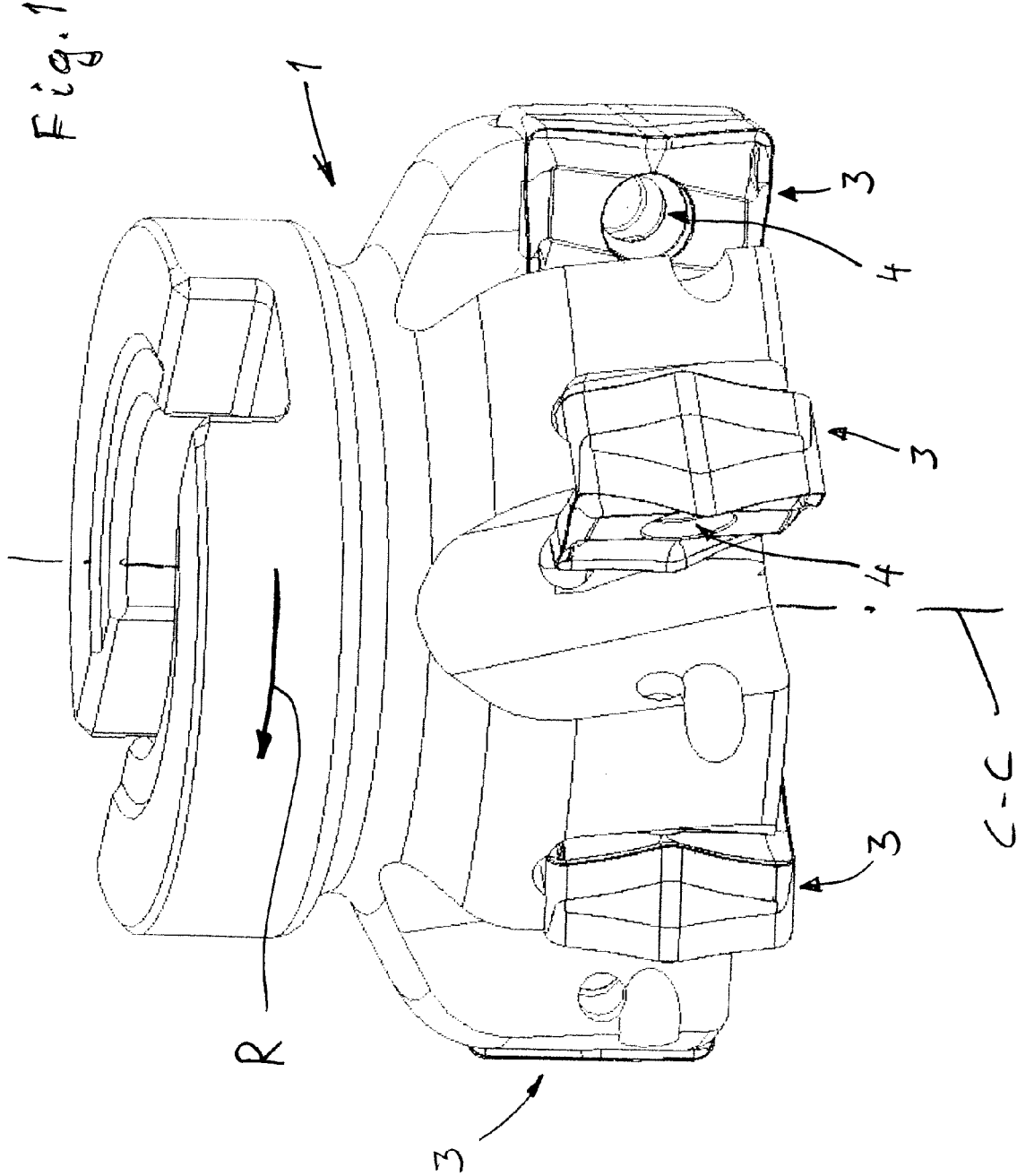
FIG. 1 shows a perspective view of a milling cutter according to the present invention.

The in FIG. 1 shown milling cutter according to the present invention comprises a milling cutter body 1, which at its lower end in FIG. 1 has a number of cutting insert pockets, in which a corresponding number of indexable cutting inserts 3 is received. Each indexable cutting insert 3 has a center hole 4 and is intended to be clamped in a cutting insert pocket by means of a center screw (not shown) received by the center hole 4. In FIG. 1 the center axis C-C of the milling cutter is drawn, the center axis C-C also defining the axis of rotation of the milling cutter and its axial direction. The rotational direction R of the milling cutter is depicted by an arrow in FIG. 1.

The milling cutter body 1 is formed for connection with a tool attachment or similar at its upper end in FIG. 1.

Figure 2:
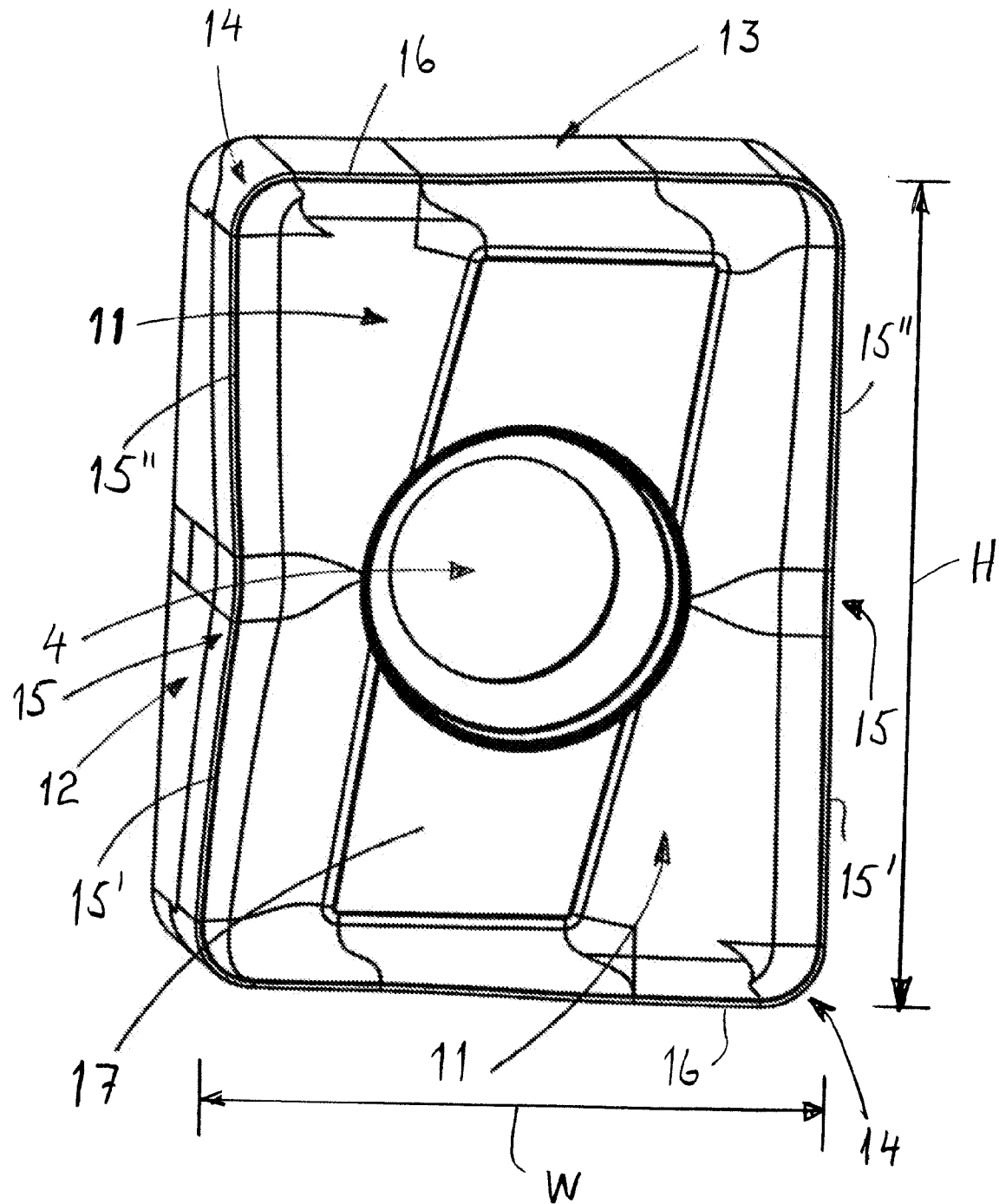
FIG. 2 shows a first perspective view somewhat oblique from the front of an indexable cutting insert according to the present invention, the milling cutter according to the present invention being provided with a number of such indexable cutting inserts.
Figure 3:
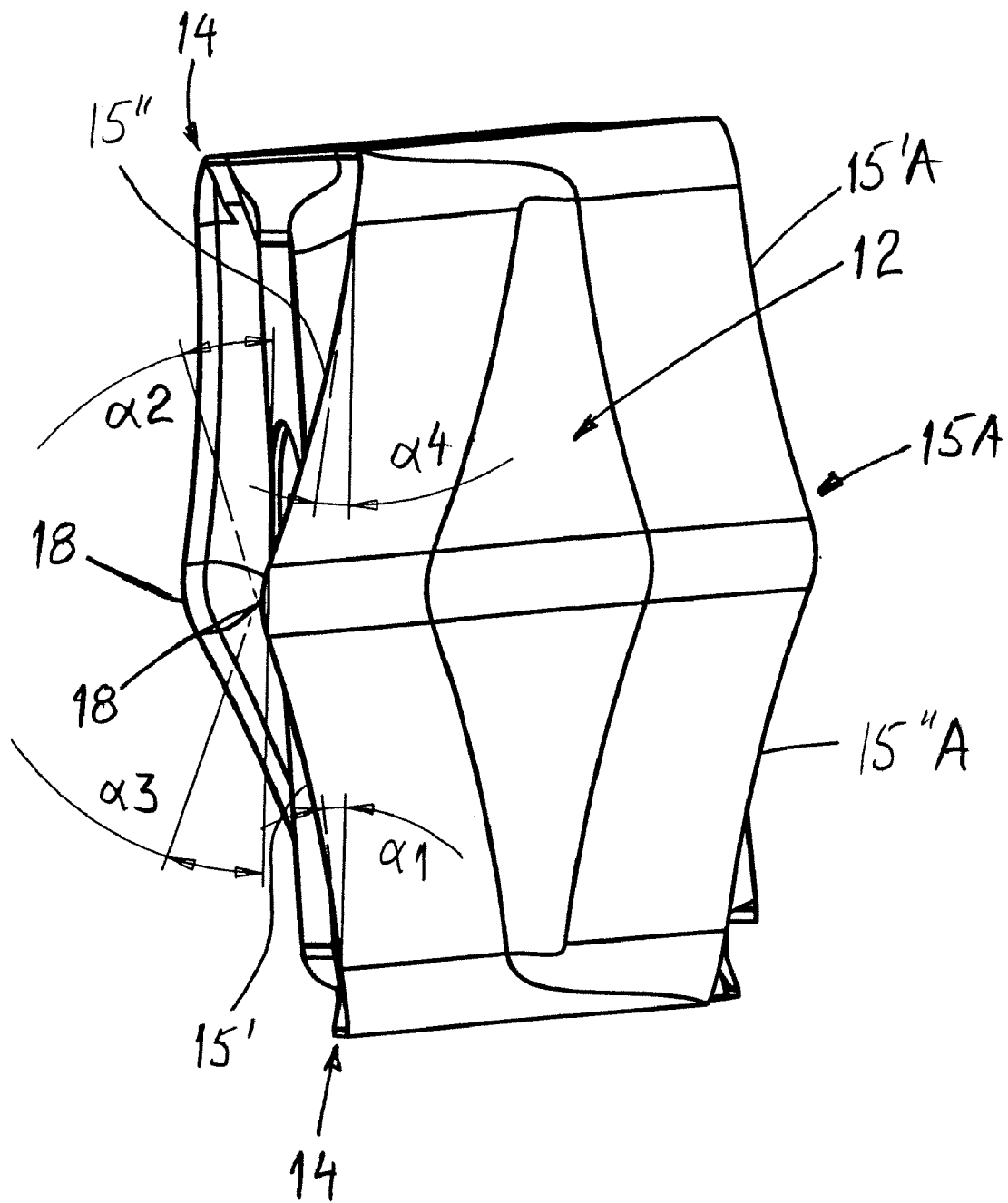
FIG. 3 shows another perspective view of the indexable cutting insert according to FIG. 2, the cutting insert being shown from the long side.
Figure 4:
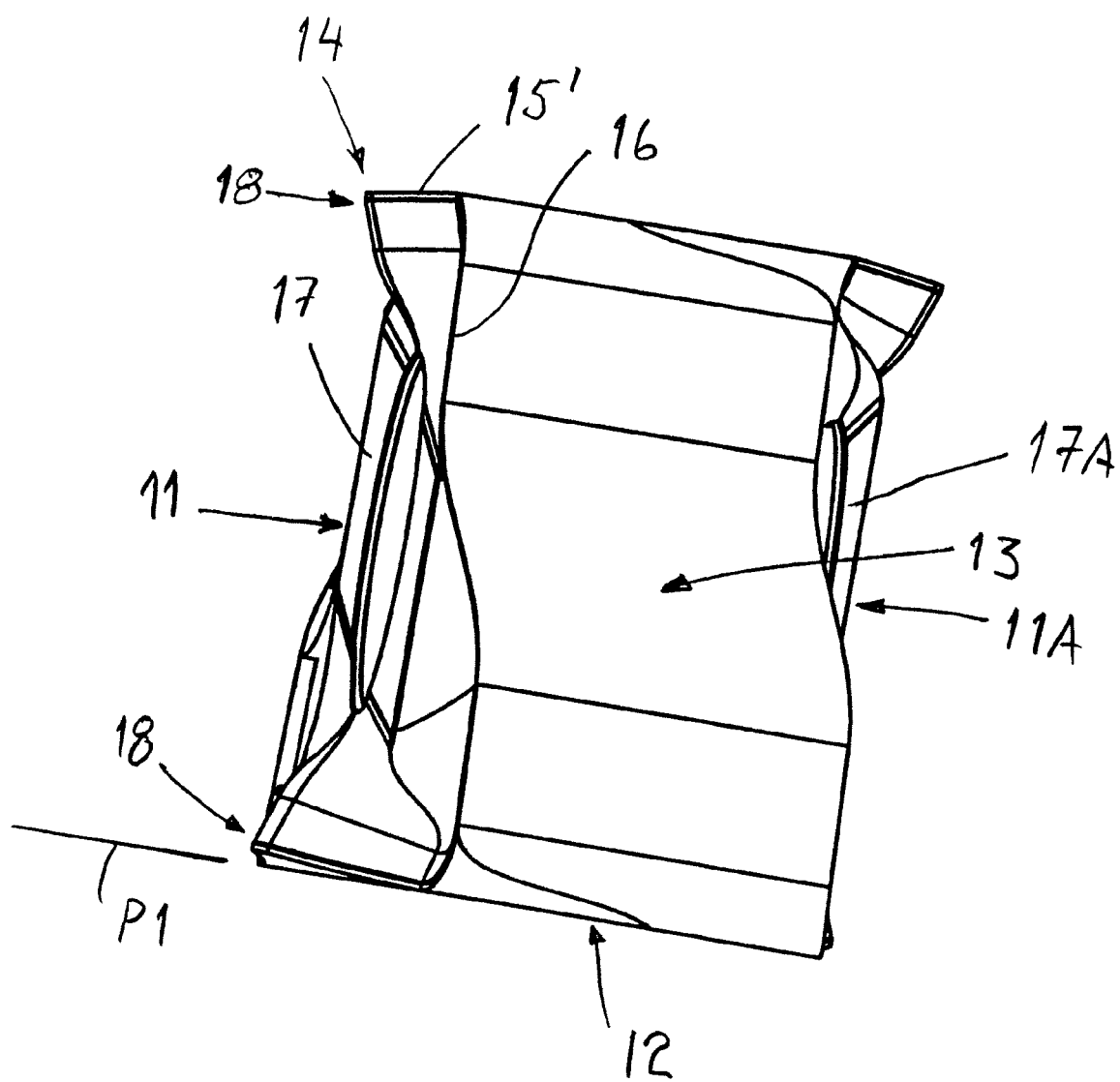
FIG. 4 shows a perspective view of the cutting insert, from its short side.

An indexable cutting insert according to the present invention in different perspective views is shown in FIGS. 2-4. The indexable cutting insert 3 according to the present invention is generally rectangular in plan view. The indexable cutting insert 3 is made of directly pressed cemented carbide. With "cemented carbide" is here meant WC, TiC, TaC, NbC, etc., in sintered combination with a binder metal such as for example Co or Ni. The cutting insert is preferably at least partly coated with layer of for example $Al_2O_3$, TiN and/or TiCN. In some cases it can be well-founded that the cutting edges are made of brazed on super hard material such as CBN or PCD.

The height of the indexable cutting insert 3 is designated H in FIG. 2. The width of the indexable cutting insert 3 is designated W in FIG. 2. In the shown embodiment H is greater than W, preferably at least 30% greater than W.

The indexable cutting insert 3 according to the present invention comprises two substantially identical main surfaces 11, 11A. The center hole 4 extends between the main surfaces 11, 11A. The indexable cutting insert 3 also comprises two long sides or side surfaces 12 and two short sides or end surfaces 13. The side surfaces 12 and the end surfaces 13 intersect at a cutting insert corner 14. Also, a part of a main surface 11, 11A connects to each cutting insert corner 14. The two cutting insert corners 14 situated on the same main surface are diagonally opposed, as seen in plan view of the indexable cutting insert 3. The remaining two corners on one side do not have any cutting function. Of the four cutting insert corners 14 that the indexable cutting insert 3 comprises only one is active at the time, see FIG. 1.

A major or main cutting edge 15 originates from each cutting insert corner 14, which extends in the height direction of the indexable cutting insert 3 and substantially along the entire associated side surface 12. Also a minor cutting edge 16 originates from each cutting insert corner 14, which extends in the width direction of the indexable cutting insert 3 and along a part of the associated end surface 13. The part of the main surface 11, 11A connecting to the main cutting edge 15 and the minor cutting edge 16 is formed as a chip breaker.

Such as is best evident from FIG. 3 the active the main cutting edge 15 of the indexable cutting insert 3 has a negative, increasing axial angle from the cutting corner 14 to approximately half the extension of the indexable cutting insert 3 in the height direction, when the indexable cutting insert is mounted in a cutting insert seat in the milling cutter body 1. This part of the main cutting edge 15 is depicted by 15'. The negative axial angle is depicted by $\alpha 1$ in the vicinity of the cutting corner 14 and with $\alpha 2$ in the area of the half height of the indexable cutting insert 3. From FIG. 3 is also evident that the part of the main cutting edge 15 that in FIG. 3 is situated above the half height of the indexable cutting insert 3 is depicted by 15". This part 15" has a positive axial angle, which diminishes in direction from the half height and upwards. In the area of the half height of the indexable cutting insert 3 the positive axial angle is designated $\alpha 3$ and in the area of the upper end of the indexable cutting insert 3 in FIG. 3 the positive axial angle is designated $\alpha 4$. For exemplifying but not limiting purposes can be mentioned that an appropriate value for $\alpha 1$ and $\alpha 4$ is about 7° while an appropriate value for $\alpha 2$ and $\alpha 3$ is about 18°. Consequently, for the embodiment of the indexable cutting insert 3 shown in FIGS. 2-4 applies that the negative axial angle increases from about 7° to about 18° while the positive axial angle diminishes from about 18° to about 7°. The main cutting edge 15 comprises a crest 18 provided where the parts 15' and 15" of the main cutting edge connect to each other. The crest 18 is indented in relation to a plane P1 that touches the associated side surface 12 at least at three points.

The above described design of the axial angle of the main cutting edge 15 entails that the perpendicular distance of each main cutting edge 15 to a plane that is situated in the opposed support surface 17A increases in direction from the cutting corner 14 to the area of the half height of the indexable cutting insert 3. The perpendicular distance of each main cutting edge 15 to the plane that is situated in the opposed the support surface 17A diminishes from the area of the half height of the indexable cutting insert 3 and from the cutting corner 14, in direction towards the passive corner. The distance is consequently related relative to the support surface 17, 17A that is provided farthest from the current or operative main cutting edge 15, and therefore the expressions "the support surface facing away from the main cutting edge" and "opposed" is used in the claims. Each support surface 17, 17A is provided distant from the periphery of the indexable cutting insert to avoid interference with cutting edge areas.

In FIG. 3 a major or main cutting edge is depicted by 15A, which is associated with the main surface 11A, see FIG. 4. The main cutting edge 15A comprises two parts of the main cutting edge 15'A and 15"A.

Such as is best visible in FIG. 2 the side surfaces 12 have a certain concavity in the height direction of the indexable cutting insert 3, at least in the part of the side surfaces 12 that connect to the main cutting edge 15. The reason for this design is that the right main cutting edge 15 in FIG. 2 must be completely straight in the shown perspective view.

Such as is best visible in FIG. 4 the main surfaces 11 and 11A are each provided with a support surface 17 and 17A, respectively. Each support surface 17, 17A is generally angled in the height direction of the indexable cutting insert 3 substantially in its diagonal direction such that the distance between the support surface 17 and the main cutting edge 15 is greater in the area of the cutting corner 14, i.e., greater in the area of the lower part 15' of the main cutting edge than in the area of the upper part 15" of the main cutting edge 15. The reason that the support surface 17 has been given a certain inclination in the height direction of the indexable cutting insert 3 is that thereby the distance to the main cutting edge 15 in the area of the cutting corner 14 is reduced. This is perceived also by observing FIG. 2. The support surface 17A situated at the opposite side, not visible in FIG. 2, has an inclination which makes that the support surface 17A generally approaches the main cutting edges 15 when the support surface 17A approaches respective cutting insert corner 14. In mounted position the support surface 17A cooperates with a correspondingly elevated portion in the insert pocket, whereby an outstandingly rigid fixation of the indexable cutting insert 3 in the insert pocket is achieved.

The invention is in no way limited to the above-described embodiment but can be freely varied within the limits of the appended claims.

What is claimed is:

1. A milling cutter for chip removing machining, the milling cutter comprising a milling cutter body with at least one insert pocket associated with an end of the milling cutter body, wherein an opposite end of the milling cutter body is shaped to cooperate with a tool attachment, an indexable cutting insert being secured in each cutting insert pocket, wherein each indexable cutting insert has two substantially identical main surfaces, wherein two side surfaces and two end surfaces extend between the main surfaces, each main surface comprising two cutting insert corners, each cutting insert corner comprising a main cutting edge and a minor cutting edge, wherein a part of each main surface comprises rake faces, wherein a part of each side surface and each end surface comprises clearance surfaces, the cutting insert having a height between the end surfaces, each main surface comprising an associated support surface, wherein a perpendicular distance from each main cutting edge on either one of the two main surfaces to a plane that coincides with the support surface on the other one of the two main surfaces increases in direction from the cutting corner defined by the main cutting edge to a crest proximate a half height of the indexable cutting insert.

2. The milling cutter according to claim 1, wherein a perpendicular distance from each main cutting edge to a plane that is situated in an opposed support surface diminishes in a direction from the crest proximate the half height of the indexable cutting insert away from the cutting corner.

3. The milling cutter according to claim 2, wherein the part of each side surface that comprises a clearance surface is concave in a height direction of the indexable cutting insert.

4. The milling cutter according to claim 1, wherein the part of each side surface that comprises a clearance surface is concave in a height direction of the indexable cutting insert.

5. An indexable cutting insert, the indexable cutting insert having two substantially identical main surfaces, wherein two side surfaces and two end surfaces extend between the main surfaces, each main surface comprising two cutting insert corners, each cutting insert corner comprising a main cutting edge and a minor cutting edge, wherein a part of each main surface comprises a rake face, wherein a part of each side surface and each end surface comprises a clearance surface, the cutting insert having a height between the end surfaces, each main surface comprising an associated support surface, wherein a perpendicular distance from each main cutting edge on either one of the two main surfaces to a plane that coincides with the support surface on the other one of the two main surfaces increases in a direction from the cutting corner defined by the main cutting edge to a crest proximate a half height of the indexable cutting insert.

6. The indexable cutting insert according to claim 5, wherein the perpendicular distance of each main cutting edge to a plane that is situated in an opposed support surface diminishes in a direction from the crest in the area of the half height of the indexable cutting insert away from the cutting corner.

7. The indexable cutting insert according to claim 6, wherein the part of each side surface that comprises a clearance surface is concave in a height direction of the indexable cutting insert.

8. The indexable cutting insert according to claim 7, wherein each main surface has a support surface, and a distance between the major cutting edge and the support surface diminishes in a height direction of the indexable cutting insert, in a direction from the cutting corner.

9. The indexable cutting insert according to claim 8, wherein each support surface is provided remote from a periphery of the indexable cutting insert.

10. The indexable cutting insert according to claim 5, wherein the part of each side surface that comprises a clearance surface is concave in a height direction of the indexable cutting insert.

11. The indexable cutting insert according to claim 10, wherein each main surface has a support surface, and a distance between the major cutting edge and the support surface diminishes in a height direction of the indexable cutting insert, in a direction from the cutting corner.

12. The indexable cutting insert according to claim 10, wherein each support surface is provided remote from a periphery of the indexable cutting insert.

13. The indexable cutting insert according to claim 12, wherein each support surface is provided remote from a periphery of the indexable cutting insert.

14. The indexable cutting insert according to claim 4, wherein the insert is adapted for milling of perpendicular corners in a work piece.

* * * * *